United States Patent

Safonov

[15] 3,700,935

[45] Oct. 24, 1972

[54] FISSION-ELECTRIC CONVERTER

[72] Inventor: George M. Safonov, 327 Swarthmore Ave., Pacific Palisades, Calif. 90272

[22] Filed: May 26, 1969

[21] Appl. No.: 827,829

[52] U.S. Cl. ................................310/3 R, 310/3 D
[51] Int. Cl. .............................................G21d 7/00
[58] Field of Search ..........................310/3, 3 D, 3 R

[56] References Cited

UNITED STATES PATENTS 2,789,241  4/1957  Frey, Jr.....................310/3 D

*Primary Examiner*—Rodney D. Bennett, Jr.
*Assistant Examiner*—S. C. Buczinski
*Attorney*—Irving J. Levin

[57] ABSTRACT

Electric generator apparatus for producing useful electric energy through direct conversion of kinetic energy of positively charged atomic fragments produced by nuclear fission by utilizing a fragment collecting electrode selectively permeable as respects the negatively charged electrons. These electrons are decelerated and collected by a collector electrode and returned through a suitable electrode to the source electrode.

24 Claims, 3 Drawing Figures

PATENTED OCT 24 1972 3,700,935

INVENTOR
GEORGE M. SAFONOV
BY
ATTORNEYS

FISSION-ELECTRIC CONVERTER

This invention relates to power generators and more particularly to unique apparatus and method of converting energy released by nuclear fission directly to electrical energy.

The direct conversion of nuclear to electrical energy has been proposed heretofore but such proposals are subject to certain limitations, disadvantages and objections avoided by the present invention.

For example, the operability of a fission electric converter depends upon suitable mode for returning negatively charged delta electrons yielded by the emission of positively charged fragments from the emitter electrodes back to the emitter. Without such means and negative deltas will cancel the positive charges impinging on the fragment collector electrode.

Prior fission electric converter proposals utilize either a magnetic field provided by a magnetron, or an electric field produced by a fine wire grid to return deltas to the emitter electrode. Each of these methods utilizes either a magnetic or an electric field causing the deltas to move along trajectories confined to the vacuum between the emitter and collector electrodes.

The magnetron method is subject to the disadvantages attending the generation of a suitable magnetic field, and must be constructed of materials having a minimum tendency to absorb neutrons vital to maintain fission chain reaction and possessing high electrical and heat conductivities as required for practical magnetic coils, permanent magnets not being feasible because of their pronounced parasitic neutron absorption properties. Also, in a magnetic field, the characteristically long delta trajectories permit objectionable ionizing collisions with the residual gas resulting in power losses. Control of deltas near the ends of the electrodes is still another disadvantage of the magnetron fission electric converter method.

The suppresser grid method presents problems of providing, supporting and maintaining large areas of fine wire grids in the space between the fragment emitter and collector electrodes. The grid must be sufficiently fine to provide minimum obstruction to the passage of fragments to the collector. The net electrostatic force resulting fro the electric fields associated with the high operating potentials required for efficient energy conversion sometimes overstress the fine wires causing wire rupture and loss of efficiency. Also, the curvature of small wires produces high electric fields with resulting electron emission and loss of available power. Still another disadvantage of the suppresser grid method involves the collision of a portion of the fragment with the grid wires and production of uncontrolled delta electrons and further power losses.

A difficulty common to both of the above mentioned prior methods involves degassing the fragment collector electrode which is thick relative to that required in practicing this invention. Absorbed gas at a distance from the surface constantly diffuses toward the surface where it is liberated as electrically charged particles or heavy ions, producing internal currents further reducing available power. In fact, these ions bombard the emitter and release negatively charged particles. The net result is a divergently growing exchange of particles between the emitter and collector electrode representing power losses and can lead to internal arc breakdown.

The present invention avoids these problems by utilizing a different mode of returning deltas to the fragment emitter. Here the deltas are accelerated toward a thin metallic fragment collector electrode effective to capture the heavy fragments but readily penetrated by the highly accelerated deltas with only a small loss of kinetic energy. The bulk of the acceleration energy is recovered as a result of the decelerating field between the foil and the delta catching electrode positioned on the remote side of the foil from the fragment-emitting electrode. To permit collection of deltas, delta collector is held at a suitable positive potential relative to the emitter electrode by a suitable supply unit connected between the emitter and delta collecting electrodes and effective to return the deltas to the emitter. Stresses in the foil are held to predetermined low levels by appropriate location of the foil between the fragment emitter and the delta collector electrodes.

The field emission problem attending the use of a suppresser grid is avoided in the present method since the foil is at positive potential and is less highly curved than the surfaces of the negative potential fine grids. Additionally, the foil is not subject to the high tensile stresses inherent in wire grid systems.

It will be understood that the present invention, as is likewise true of the suppresser grid method, enjoys an advantage over the magnetron method in that the deltas move along short, straight line trajectories thereby eliminating the problem of delta control at the electrode ends inherent in the magnetron method.

THis invention not only can utilize fragments produced by controllable chain reactors fed by neutron fissionable fuels as envisioned by prior art methods, but also spontaneously fissioning radioactive materials which emit alpha particles or protons upon disintegration.

It is therefore a primary object of this invention to provide novel apparatus for converting energy originating in nuclear fission directly to electrical energy using selectively permeable barrier means for collecting the heavier positively charged fragments and second barrier means for collecting delta particles passing through the permeable barrier means.

Another object of the invention is the provision of highly efficient energy converter means for separating the products of nuclear fission and separately collecting the energy on the respective positively and negatively charged components.

Another object of the invention is the provision of a nuclear fission energy device having means for decelerating and recovering the energy carried by heavier fragments on one collector and for decelerating and recovering the energy carried by delta particles or other collector means thereby to provide a source of electrical power.

Another object of the invention is the provision of an improved nuclear fission energy converter utilizing a selectively permeable barrier supported in major part by opposed electrostatic fields on the opposite sides thereof.

Another object of the invention is the provision of a direct nuclear to electrical energy converter device having electric circuit means for returning deltas to the emitter.

Another object of the invention is the provision of an improved method of operating a nuclear to electrical energy converter device utilizing a pair of positive and negative charge collectors in an evacuated space and utilizing low-potential electrical energy to heat and degas the permeable positive charge collector.

Another object of the invention is the provision of a direct nuclear to electrical energy converter having a thin electron permeable positive charge collector sandwiched generally midway between fissioning material and a delta collector and supported largely by opposed electrostatic fields acting on the opposite sides thereof.

Another object of the invention is the provision of nuclear energy converter means having an electrode carrying fissioning material coated with a film of low atomic weight metal effective to minimize the number of deltas produced by the action of fission fragments.

These and other more specific objects will appear upon reading the following specification and claims and upon considering in connection therewith the attached drawings to which they relate.

Referring now to the drawings in which preferred embodiments of the invention are illustrated:

Figure 1:
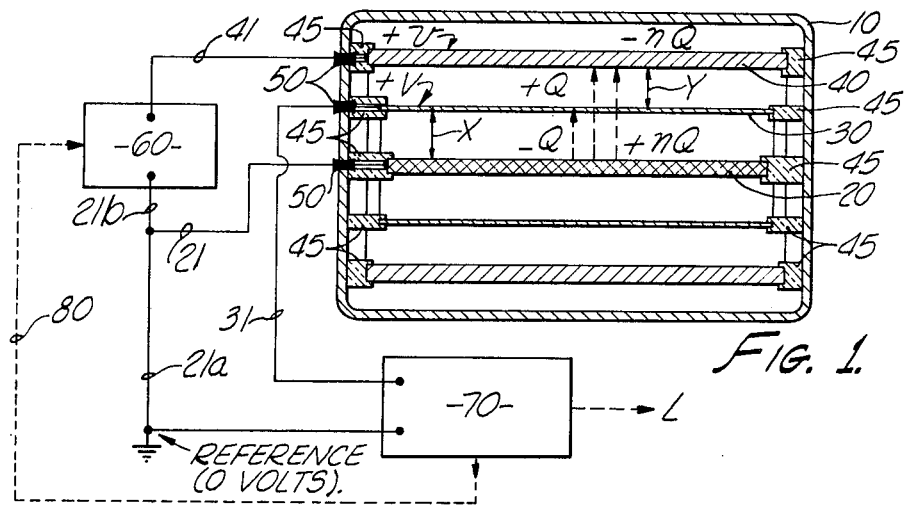
FIG. 1 is a schematic diagram of an exemplary embodiment of the invention.

Referring to FIG. 1, there is shown a sealed envelope 10 enclosing an evacuated chamber housing a fission electrode 20. The fission electrode is a conductor formed of or coated with fissioning material such as the neutron induced fissionable materials U–235 and U–233 or such as the spontaneously fissionable transurananic elements, or such as radio actively decaying materials which emit positively charged particles, as polonium 210. Encompassing electrode 20 is an electron-permeable electrode 30 coaxial with electrode 20. Electrode 30, although called a screen electrode differs from the conventional screen electrode of a multiple-electrode radio tube since it is neither mesh nor perforated. This electrode functions to intercept the principal portion if not all of the large fragments expelled as a result of fission occurring either spontaneously or as a result of fission induced by the interaction of radiations with the fissile fuel at electrode 20. The fissioning material may be coated with a film of low atomic weight metal, as, for example, lithium, beryllium, magnesium, aluminum, etc. Such a film is found highly effective in minimizing the production and/or escape of deltas and the attendant need for additional power to return escaping deltas back to the emitter in a manner to be explained presently. By deltas is meant the electrons which are set free by the action produced by fission as the fragments pass through the interface between the fragment producing electrode and the ambient vacuum.

Electrode 30 is preferably a low atomic weight metal, as beryllium, magnesium, or aluminum, since such conductive materials have a minimum scattering effect on the deltas passing through the electrode. The heavier particles, or fission fragments emitted from electrode 20, are unable to penetrate this electrode but instead are fully decelerated thereby and stopped therein, the kinetic energy lost by such deceleration being converted to heat in this fragment collecting electrode.

The thickness of electrode 30 is dependent on the material of which it is composed and the prevailing operating conditions, varying from a thin foil of about one-half mil to a thickness of 20 mils or more. Stated in terms of density, an electrode made of one of the above named materials may vary from one-half a milligram per square centimeter to as much as 50 milligrams per square centimeter.

Electrode 30 should be degassed for most efficient operation and this can be done simply and effectively by low-voltage electrical heating as an incident of the evacuating procedure for the enclosing envelope.

Encircling and spaced from electrodes 20 and 30, is an electron or delta collecting electrode 40 of suitable material such as beryllium, magnesium, aluminum. This electrode is equipped with an external electrical lead 41 passing through a seal 50 in envelope 10. Similarly, external electrical leads 21, 31 are provided to electrodes 20 and 30 through similar seals 50.

As previously mentioned, prior art fission-electric generators function by the action of an electric or a magnetic field forcing the expelled deltas back to the emitting electrode, and by collecting on a collecting electrode the predominantly positively charged fragments which, due to inertia or great momentum, are not significantly affected by the said electric or magnetic field. In contrast, the present invention functions by exploiting the pronounced differential abilities of the heavy fragments on the one hand, and the deltas on the other hand, to penetrate materials. The arrangement and selection of materials is such that the emitted and accelerated deltas move to and through the delta-permeable electrode 30, whereas the heavier emitted fragments such as ions, atoms, and groups of clusters thereof are readily intercepted by this electrode. The arrangement is such that at least a principal portion of the emitted accelerated deltas pass through the thin heavy-fragment collecting electrode and are captured by the delta-collecting electrode 40. While enroute to electrode 40, the deltas are preferably decelerated by an electric-field potential gradient applied between the two collecting electrodes. By this technique the collision energy of the deltas is greatly reduced with attendant reduction in heating and advantageous increase in the net available electric energy.

Owing to the interception of the heavy fragments by electrode 30 and the relatively free passage therethrough of deltas, a positive charge Q accumulates on that electrode. Hence, a positive potential difference of V volts is produced between electrode 30 and emitter electrode 20 and a negative charge deficiency $-Q$ exists on electrode 20. Further, as a consequence of the passage of deltas to electrode 40, a negative charge $-nQ$ develops on the latter electrode with the corollary development of a commensurate accumulation $+nQ$ on emitter electrode 20. As is evident from consideration of the accumulation of the positive Q charge on electrode 30, the heavy positive fragments are decelerated before striking that electrode, whereas the deltas are accelerated while traversing the first portion of their paths.

Unit 60, presently to be described, maintains a potential difference +v between electrode 40 and the emitting electrode 20. Since this potential is less than the +V potential maintained on electrode 30 relative to the emitter potential, the deltas, after passing electrode 30, are subjected to deceleration and arrive at electrode 40 with low kinetic energy. Although some of the delta energy is lost in penetrating electrode 30, this loss is small compared to that generated by fragment charging and thus the net available energy is not significantly reduced by this technique.

It will be understood that the deltas collected on electrode 40 must be driven back to the electrode 20 against the opposing relatively negative potential of the latter electrode by supplying electrical energy equal to the loss suffered in penetrating electrode 30. This delta returning energy is supplied from power gained at electrode 30 by the accumulation thereon of positively charged heavy fragments. This electric current flows in a power circuit 21, 21a, 31 connecting electrode 30 to the emitting electrode 20, and a power-dividing unit 70 presently to be described. The power current i flowing under the influence of the potential difference V, represents the gross power current of the cell. This gross power may be represented mathematically as $Pg = Vi$.

Unit 70 here shown as comprising an intermittent flow device and a transformer, provides power to load L and the unit 60 to the extent necessary to return to electrode 20 the deltas collected on electrode 40. The latter power passes to unit 60 via the conductors represented by dash-line 80. It will be noted that unit 60 is shown connected to electrode 20 by conductor 21b.

From the preceding description it is evident that the energy gained by deceleration and interception of the heavy positively charged fragments by electrode 30 provides not only the gross power $Pg = Vi$, but also useful power of an amount and character governed by the type of transformation employed in unit 70. Unit 70 can and preferably does supply a current I needed to operate unit 60 and maintain a positive potential +v on electrode 40. When so used, unit 70 may be termed a delta-makeup power supply since it must supply the power required to drive the collected deltas back to electrode 20 against a potential of v volts. Initially, the latter may be charged to a very high positive potential to initiate operation of the generator by suitable means, such as a beta-decay material fixed to electrode 30.

Figure 2:
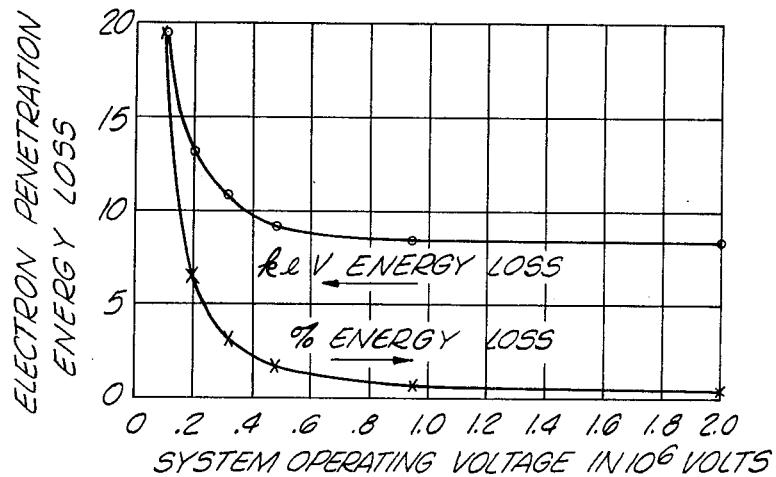
FIG. 2 is an energy graph.

Referring to FIG. 2, there is graphically displayed the delta kinetic energy loss in migrating through electrode 30 following acceleration by the positive potential +V which ranges in value from 100 to 2,000 kilovolts. Since the delta-makeup power unit 60 is operated at a positive +V potential just sufficient to return deltas to electrode 20, the penetration energy loss per electron is $ev$, where e is the elementary charge of the electron. In terms of the charge Q per fragment emitted from electrode 20 toward electrode 30, the electrostatic energy gained by the system per collected fragment is QV, Q being of the order of 20e. Denoting the negative charge on the deltas which accompany each heavy fragment by $-nQ$, the energy consumed in accelerating the deltas from electrode 20 to electrode 30 is nQV. The electrostatic energy regained by the system by deceleration of the deltas between electrodes 30 and 40 is $nQ(V-v)$. Thus, $nQV - nQ(V-v) = nQv$, is the net electrostatic energy delivered to the deltas during passage from electrode 20 to electrode 40. Hence the net electrostatic energy available from the system is $QV - nQV$.

The efficiency factor, f, may be defined as $$f = (QV - nQv)/(QV), \text{ or}$$

$$f = 1 - n(v/V)$$

Thus the overall efficiency of the apparatus is $\eta = f\eta_{FF}$, where $\eta_{FF}$ is the efficiency resulting from operation with complete delta suppression or from hypothetical operation in which no deltas exist. $\eta_{FF}$ is defined as the ratio of fragment kinetic energy converted to system electrostatic energy relative to the energy released by fission.

To return the negatively charged deltas from electrode 40 to electrode 20 against the opposing potential v, unit 60 must supply energy to the three electrode system 20, 30, 40 by an amount equal to nQV. The total energy increase deliverable outside envelope 10 is QV.

However, energy equal to nQv must be supplied to unit 60; hence the energy available for load L external to the apparatus is QV-nQv, and the efficiency is, as noted: $f = 1 - n(v/V)$.

Experimentation has shown that the number of deltas accompanying a heavy fragment emerging from electrode 20 falls generally in the range of 100 to about 300. Hence $nQ \cong (200 \pm 100)e$. Since $Q \cong +20e$, $n = nQ/Q \cong 105$. The efficiency of the system is grossly higher for operating potentials V near 1 million volts than at lower operating potentials.

Figure 3:
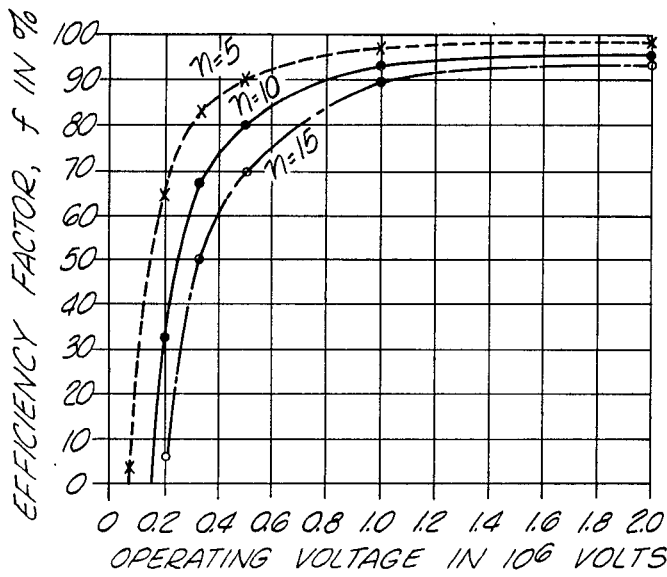
FIG. 3 is an efficiency chart indicating the system efficiencies for several values of the number of deltas per heavy fragment emitted in fission events over a range of system operating potentials.

In FIG. 3 the efficiency factor $f$, in percentage, is charted for three values of n, namely $n = 5$, $n = 10$, and $n = 15$, for operating potentials from 0.1 megavolts to 2 megavolts. The voltage range from 1 megavolts to 2 megavolts is the range in which the efficiency factor is not strongly a function of the number of deltas per heavy fission fragment and represents the desirable operating potential range. However, as indicated for example by the trace for $n = 10$, efficiencies above 60 percent are achieved with operating potentials in the range from 300 kv to 1,000 kv.

Small amounts of low atomic weight material such as beryllium, lithium, magnesium, aluminum, etc. may be added to the surface of the emitter electrode 20, with reduction of n to values of the order of 5, without grossly significant reduction in $\eta_{FF}$. Such additive materials on the emitting electrode permit system operation at potentials of the order of only 100 kv, with f equal to or greater than 0.5; and, indeed when lowered efficiencies are acceptable to provide lower system operating potentials, such coatings of low atomic weight material, permitting a thinner heavy-fragment collector 30 and consequent reduction of delta-penetration energy loss, the efficiency factor f may be fairly high.

It will be understood that the electrodes 20, 30, 40 are suitably supported within envelope 10, as by quartz struts 45, or alternately such support may be provided by means of the electrical leads to these electrodes or by a combination of such struts and leads.

In conclusion it is pointed out that considerable heat is evolved and suitable means, not shown, can be provided to assist in its dissipation. The heat gradient decreases with the distance from its source at the mass of fission material and is lower at electrode 40 than at electrode 30. Accordingly this gradient is available to pump the heat outwardly for dissipation by radiation or absorption by a source of cooling surrounding the exterior of the converter envelope. For example, either a gas or liquid coolant may be passed in heat exchange with the converter device.

While the particular fission electric converter herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A generator for generating electric energy directly from energy released by nuclear fission comprising:
    first means, including means providing an evacuated region;
    second means, including in said region an electrode comprising a mass of fissioning material effective to emit fragments of matter of two classes including electrons in one class and heavy fragments having positive electric charges in a second class;
    second means, including in said region in the paths of fragments emitted from said mass a second electrode impervious to emitted heavy fragments and pervious to at least some of the emitted electrons;
    third means, including in said region in the path of electrons emitted from said mass and passed through said second electrode a third electrode arranged to intercept passed electrons; and
    fourth means, including electrical connections to respective ones of said first second and third electrodes and electrical means connected thereby to said electrodes, effective to maintain said second electrode highly positive and said third electrode less positive relative to said first electrode and effective to induce flow of intercepted electrons from said third electrode to said first electrode against the potential gradient between said first and third electrodes;
    whereby electron flow through said fourth means to said second electrode from said first electrode under the influence of the high potential gradient therebetween provides a source of useful electric energy.

2. A generator as defined in claim 1 characterized in that said fourth means includes means to utilize a portion of the electric energy provided by the generator to maintain flow of electrons from said third electrode to said first electrode.

3. A generator as defined in claim 1 characterized in that said first means includes a sealed evacuated chamber through which extend respective electrical connections to said first second and third electrodes.

4. A generator as defined in claim 1 characterized in that said first electrode comprises an elongated element and said second and third electrodes are generally cylindrical and substantially coaxial with said first electrode.

5. A generator as defined in claim 1 characterized in that said second electrode comprises sheet metal selected from the class including aluminum, magnesium, beryllium and their alloys.

6. A generator as defined in claim 1 characterized in that said second electrode is so located between said first and third electrodes as to be supported in major part by opposed electrostatic forces acting on the opposite sides thereof.

7. A generator as defined in claim 1 characterized in that said second electrode is located generally centrally between and spaced from each of said first and third electrodes.

8. A generator as defined in claim 4 characterized in that said second electrode is located between said first and third electrodes and so spaced therefrom that the electrostatic fields acting thereon from the first and third electrodes are effective to stress said second electrode in hoop tension.

9. A converter device operable to convert energy released by nuclear energy directly into electrical energy said device comprising, in an evacuated space, first electrode means including a mass of fissioning material operable to emit electrons and relatively heavy positively charged fragments, second electrode means spaced from said first electrode means in the path of said electrons and said positively charged fragments and including foil-like conductor means permeable by electrons and acting as a barrier to the passage of positively charged fragments, and third electrode means spaced from said second electrode means in the path of electrons passing through said second electrode means.

10. A converter device as defined in claim 6 characterized in that said second electrode means surrounds said first electrode means.

11. A converter device as defined in claim 6 characterized in that said second electrode means comprises metal having a thickness ranging between one half milligram and 50 milligrams per square centimeter.

12. A converter device as defined in claim 6 characterized in that said first electrode means is an elongated member and in that said second and third electrode means are tubular and concentric to one another and to said first electrode means.

13. That method of converting nuclear fission energy directly into electrical energy which comprises: providing a mass of fissioning material effective to emit electrons and positively charged relatively larger and heavier fragments into a vacuum, interposing a conductive plaque in the path of said emitting electrons and positively charged fragments and so dimensioned as to pass electrons and to bar the passage of said positively charged fragments, interposing a conductor in the path of electrons passing beyond said plaque, whereby a positive charge accumulates on said plaque and a negative charge collects on said conductor to provide a potential difference and a reservoir of electrical energy.

14. That method defined in claim 13 characterized in the steps of locating said mass of fissioning material centrally of a surrounding first envelope of electron-permeable conductive material disposed inwardly of a surrounding second envelope of conductive material so positioned as to intercept electrons passing through said first envelope.

15. That method defined in claim 13 characterized in the step of providing said mass of fissioning material with a film of low atomic weight metallic material to minimize the production of deltas therefrom.

16. That method defined in claim 13 characterized in the step of utilizing electrostatic fields on the opposed sides of said conductive plaque to place the same in slight tension.

17. That method defined in claim 13 characterized in the steps of carrying out the steps there set forth under vacuum conditions.

18. That method defined in claim 18 characterized in the steps of providing an electrically energized return circuit between said mass of fissioning material and said conductor in the path of electrons effective to return electrons to said fissioning material.

19. That method defined in claim 19 characterized in the step of applying low voltage electrical energy to said conductive plaque for a period of time initially to degas said plaque.

20. That method defined in claim 13 characterized in that said fissioning material is a spontaneously fissionable material.

21. That method defined in claim 13 characterized in that said spontaneously fissionable material is a material which disintegrates by emission of a positive proton.

22. That method defined in claim 13 characterized in that said spontaneously fissionable material is one which disintegrates by emission of alpha particles.

23. That method defined in claim 13 characterized in the utilizing of a fissioning material selected from the group including U–235, a transurananic or a radio actively decaying material emitting a positively charged particle as polonium 210.

24. That method defined in claim 13 characterized in the step of utilizing electrostatic fields on the opposed sides of said conductive plaque to aid in supporting the same in a desired operating position between said fissioning material and the collector for negative charges.

* * * * *